United States Patent [19]
Behrens et al.

[11] Patent Number: 5,417,244
[45] Date of Patent: May 23, 1995

[54] VALVE WITH NOISE REDUCING TWO STAGE PRESSURE DROP

[75] Inventors: Hermann W. Behrens, Rancho Palos Verdes, Calif.; Wendell L. Gilbert, Pleasant Shade, Tenn.; George M. Harpole, San Pedro, Calif.; Jane M. Lin, Rancho Palos Verdes, Calif.; Michael F. Wolff, Torrance, Calif.

[73] Assignee: TRW Inc., Lyndhurst, Ohio

[21] Appl. No.: 192,263

[22] Filed: Feb. 7, 1994

[51] Int. Cl.[6] ............................................... F15B 9/00
[52] U.S. Cl. ............................. 137/625.23; 91/375 A
[58] Field of Search ..................... 137/625.23, 625.24; 91/375 A

[56] References Cited

U.S. PATENT DOCUMENTS

| | | |
|---|---|---|
| 4,335,749 | 6/1982 | Walter . |
| 4,469,342 | 9/1984 | Millard . |
| 4,516,471 | 5/1985 | Duffy . |
| 4,799,514 | 1/1989 | Tanaka et al. . |
| 4,848,402 | 7/1989 | Elser ............................ 137/625.23 |
| 5,097,869 | 3/1992 | Emori . |
| 5,207,244 | 5/1993 | Behrens et al. . |
| 5,259,413 | 11/1993 | Harpole et al. . |

OTHER PUBLICATIONS

Technical sketch of a BMW/ZF-2 Step Valve dated Mar. 18, 1993.

Primary Examiner—Robert G. Nilson
Attorney, Agent, or Firm—Tarolli, Sundheim & Covell

[57] ABSTRACT

A valve for controlling flow of hydraulic fluid. The valve includes first and second relatively movable valve members (60 and 62). The valve members (60 and 62) include cooperating surfaces (112, 142, 144) which define first and second orifices for metering fluid from a pressurized fluid source (44) toward first and second locations (22 and 24) in a fluid utilization device (12). The valve members (60 and 62) have a displaced position in which the first orifice is increased in size and the second orifice is decreased in size. The increased size of the first orifice reduces a pressure drop across the first orifice. The decreased size of the second orifices increases a pressure drop across the second orifice. The valve members (60 and 62) include means (114 and 146) for increasing a pressure on a downstream side of the second orifice to reduce the pressure drop for controlling valve noise.

20 Claims, 6 Drawing Sheets

VALVE WITH NOISE REDUCING TWO STAGE PRESSURE DROP

BACKGROUND OF THE INVENTION

The present invention relates to a valve for controlling flow of hydraulic fluid. The valve is used to control the flow of hydraulic fluid to a power steering motor.

A known power steering control valve for controlling flow of hydraulic fluid to a power steering motor includes a hollow valve sleeve and a valve core. The valve core is positioned within the valve sleeve. The valve core and the valve sleeve are relatively rotatable. Each of the valve core and valve sleeve has a plurality of lands and grooves.

When the valve core and valve sleeve are in a neutral position fluid is communicated to opposite chambers of the power steering motor at equal pressures. When the valve core and valve sleeve are relatively rotated from the neutral position, fluid flow is variably restricted. Restriction of the fluid flow causes pressurized fluid to be delivered to one of two chambers of a hydraulic power assist motor to cause motor actuation.

The restriction is provided by lands on the valve core and valve sleeve which define flow orifices. Variation of the flow orifices, and the amount of restriction, is provided by end surface segments of the lands which are formed such that varied amounts of relative rotation between the valve core and valve sleeve cause the end surface segments to be positioned at varying distances apart. Due to a high volume of hydraulic fluid flow and pressure differential changes as the hydraulic fluid flows through the flow orifices, noise may be created in the control valve.

SUMMARY OF THE INVENTION

The present invention is directed to a valve for controlling flow of hydraulic fluid. The valve includes first and second relatively movable valve members. The valve members include cooperating surfaces for defining first and second orifice means for metering fluid from a pressurized fluid source toward first and second locations in a fluid utilization device, respectively. The valve members have a displaced position in which the first orifice means is increased in size and the second orifice means is decreased in size. The increased size of the first orifice means reduces the magnitude of a pressure differential across the first orifice means. The decreased size of the second orifice means increases the magnitude of a pressure differential across the second orifice means. The valve members include means for increasing a pressure on a downstream side of the second orifice means to reduce the magnitude of the pressure differential across the second orifice means for controlling valve noise.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENT

The fluid control valve 10 (FIG. 1) of the present invention may be used to control fluid flow associated with mechanisms of a variety of constructions and uses. Preferably, the control valve 10 is utilized in a power steering gear 12 for turning dirigible wheels (not shown) of a vehicle (not shown) to effect steering of the vehicle. The preferred power steering gear 12 is a TAS Integral Power Steering Gear manufactured and marketed by TRW Inc., Commercial Steering Division of Lafayette, Ind., and identified as TAS40, TAS55 or TAS65.

Figure 1:
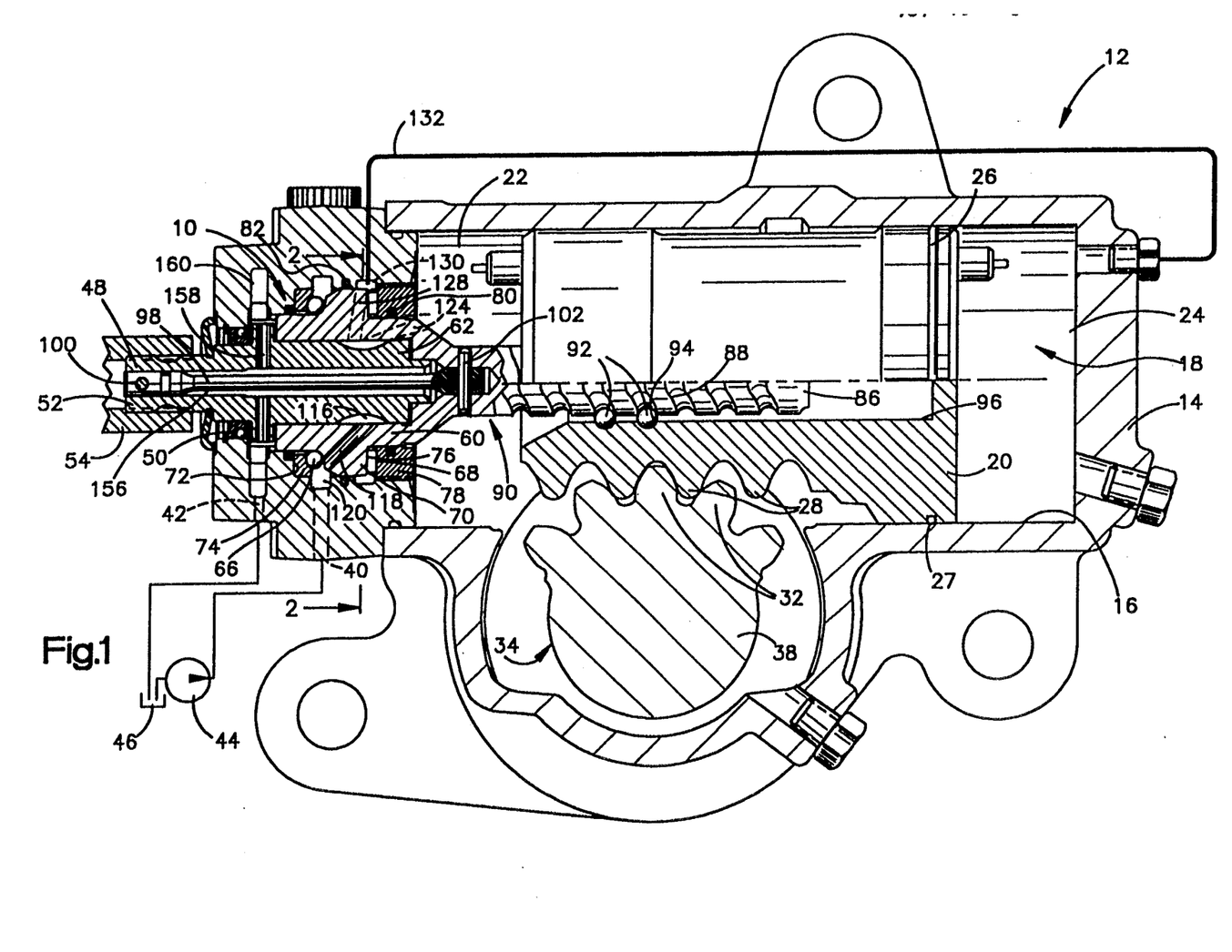
FIG. 1 is a longitudinal cross-sectional view of a power steering gear with a valve which embodies the present invention.

The power steering gear 12 includes a housing 14 having an inner cylindrical surface 16 defining a chamber 18. A piston 20 divides the chamber 18 into opposite chamber portions 22 and 24 located at opposite ends of the piston 20. An O-ring 26 carried in a groove 27 in the piston 20 provides a fluid seal between the chamber portions 22 and 24.

A series of rack teeth 28 are formed on the periphery of the piston 20. The rack teeth 28 mesh with teeth 32 formed on a sector gear 34. The sector gear 34 is fixed on an output shaft 38 which extends outwardly from the steering gear 12 through an opening (not shown) in the housing 14. The output shaft 38 is typically connected to a Pitman arm (not shown) which in turn is connected to a steering linkage (not shown) of the vehicle. Thus, as the piston 20 moves in the chamber 18, the output shaft 38 is rotated to operate the steering linkage as is understood by those skilled in the art.

The housing 14 includes a fluid inlet port 40 and a fluid return port 42. The inlet port 40 and return port 42 are adapted to be connected in fluid communication with hydraulic circuitry (schematically illustrated) including a power steering pump 44 and a power steering pump fluid reservoir 46. The control valve 10 can direct pressurized fluid from the inlet port 40 to one or the other of the chamber portions 22 and 24. Fluid from the other of the chamber portions 22 and 24 is simultaneously directed by the control valve 10 to the return port 42 which is connected with the reservoir 46.

The control valve 10 is actuated by a rotatable shaft 48. The shaft 48 is supported for rotation relative to the housing 14 via bearing member 50. An outer end portion 52 of the shaft 48 is splined for receiving a portion of a shaft 54 thereon. The shaft 54 is connected with a steering wheel (not shown) which is manually turned by the operator of the vehicle to effect steering of the vehicle.

The control valve 10 includes a valve sleeve 60 and a valve core 62. The valve core 62 is integrally formed with the shaft 48. The valve core 62 is located within the valve sleeve 60 and is coaxial with the valve sleeve 60. The valve core 62 is rotatable relative to the valve sleeve 60 about a common axis 64 (FIG. 2) of the valve core 62 and valve sleeve 60.

The valve sleeve 60 (FIG. 1) is supported for rotation by bearings 66 and 68 located between the valve sleeve 60 and the housing 14. The bearing 66 is located between an annular projecting portion 70 of the valve sleeve 60 and a radial wall 72 of the housing 14. The bearing 66 is a ball bearing. Also, a seal ring 74 is located between the outer surface of the valve sleeve 60 and the housing 14.

The bearing 68 is a thrust bearing and is located between a radial surface 76 of the annular projecting portion 70 of the valve sleeve 60 and a retaining nut 78. The nut 78 is threaded into the housing 14 and holds the control valve 10 in position in the housing 14. A seal ring 80 is located between the nut 78 and an outer surface of the valve sleeve 60. Another seal 82 is disposed in a groove in the housing 14.

The valve sleeve 60 is integrally formed with a follow-up member 86 which has a screw thread portion 88 formed in its outer periphery. The valve sleeve 60 and the follow-up member 86 form an integral one-piece unit 90. A plurality of balls 92 are located in the screw thread portion 88. The balls 92 are also located in an internally threaded portion 94 formed in a bore 96 of the piston 20. Axial movement of the piston 20 corresponds to rotation of the follow-up member 86, as is known.

A torsion bar 98 is connected between the input shaft 48 and the follow-up member 86 by pins 100 and 102, respectively. During a steering maneuver, the torsion bar 98 can transfer rotational force from the input shaft 48 to the follow-up member 86. However, if the follow-up member 86 is resistant to rotation in unison with the input shaft 48, the torsion bar 98 twists and the valve core 62 is rotated relative to the valve sleeve 60, away from the neutral position. When the valve core 62 is rotated relative to the valve sleeve 60, the piston 20 moves due to application of pressurized fluid to one of the chamber portions 22, 24. When the steering maneuver is terminated, the one-piece unit 90, and thus the valve sleeve 60, will rotate relative to the valve core 62 and return the valve core 62 and the valve sleeve 60 to the neutral position.

The valve sleeve 60 (FIG. 2) has three pairs of diametrically opposed lands, 106, 108, and 110, respectively, which have end surfaces 112, 114, and 116, respectively. The valve sleeve 60 has two radially directed passages 118 extending from its outer circumference to its inner circumference. The passages 118 are diametrically opposed about the valve sleeve 60 and extend through respective end surfaces 112 of lands 106. The passages 118 communicate with an annulus 120 (FIG. 1) in the housing 14. The annulus 120, in turn, is connected with the inlet port 40, and is thus subjected to the fluid pressure from the power steering pump 44.

The valve sleeve 60 (FIG. 2) has on its inner surface two axially extending grooves 122. The two grooves 122 are diametrically opposed about the inner circumference of the valve sleeve 60. Each groove 122 is located between a respective land 106 and a respective land 110. Each of the grooves 122 communicates with a respective passage 124. The passages 124 are spaced 180° apart about the valve sleeve 60. The passages 124 (FIG. 1 shows only one passage 124, in phantom) communicate with the chamber portion 22.

The valve sleeve 60 (FIG. 2) has two axially extending grooves 126 on the inner surface thereof. The grooves 126 are diametrically opposed about the inner circumference of the valve sleeve 60. Each groove 126 is located between a respective land 106 and a respective land 108. Each of the grooves 126 communicates with a respective radially extending passage 128. The passages 128 are spaced 180° apart about the valve sleeve 60.

The passages 128 (FIG. 1 shows only one passage 128, in phantom) communicate with an annulus 130 in the housing 14. The annulus 130 communicates with a suitable housing passage 132 which, in turn, communicates with the chamber portion 24. The valve sleeve 60 (FIG. 2) also has two axially extending grooves 134 on the inner face thereof. The grooves 134 are diametrically opposed. Each groove 134 is located between a respective land 108 and a respective land 110.

Figure 2:
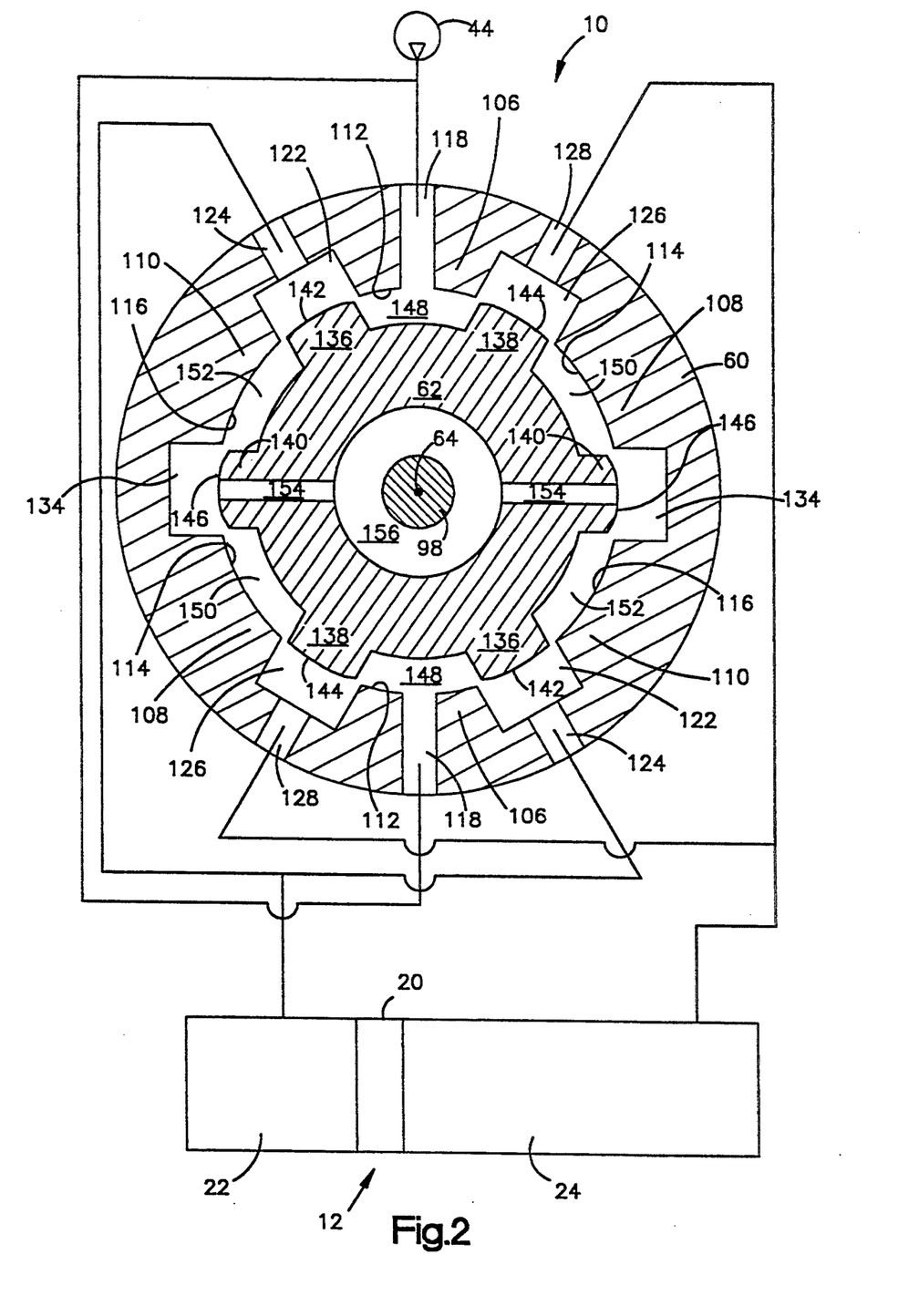
FIG. 2 is a partial sectional view of the valve taken along line 2—2 of FIG. 1 and includes schematic hydraulic connection representations.

The valve core 62 has three pairs of diametrically opposed lands 136, 138 and 140, respectively, which have end surfaces 142, 144 and 146 respectively. The valve core 62 has two axially extending grooves 148 (FIG. 2) in its outer circumference. The grooves 148 are diametrically opposed about the outer circumference of the valve core 62 and communicate with the passages 118 in the valve sleeve 60. Each groove 148 is located between a respective lands 136 and 138. The extent of the grooves 148 around the outer circumference of the valve core 62 is such that each of the grooves 148 communicates equally with respective grooves 122 and 126 when the valve core 62 is in a centered or neutral position relative to the valve sleeve 60 (as shown in FIG. 2).

The valve core 62 has two axially extending grooves 150 in its outer circumference. The grooves 150 are diametrically opposed about the outer circumference of the valve core 62. Each groove 150 is located clockwise (as shown in FIG. 2) about the valve core 62 from an adjacent groove 148 and between a respective land 138 and a respective land 140. The extent of the grooves 150 around the outer circumference of the valve core 62 is such that each of the grooves 150 communicates with respective grooves 126 and 134 when the valve core 62 is in the neutral position relative to the valve sleeve 60.

The valve core 62 has two axially extending grooves 152 in its outer circumference. The grooves 152 are diametrically opposed about the outer circumference of the valve core 62. Each groove 152 is located counter-clockwise (as shown in FIG. 2) about the valve core 62 from an adjacent groove 148 and between a respective land 136 and a respective land 140. The extent of the grooves 152 around the outer circumference of the valve core 62 is such that each of the grooves 152 communicates with respective grooves 122 and 134 when the valve core 62 is in the neutral position relative to the valve sleeve 60.

The valve core 62 has two radially extending internal passages 154. Each passage 154 extends through a respective land 140 and communicates with a respective groove 134 on the valve sleeve 60. The passages 154 communicates with an internal passage 156 of the valve core 62. The internal passage 156 of the valve core 62 also communicates with a plurality (four) of radially extending passages 158 (FIG. 1, only two shown) which extend through the valve core 62. The radially extending passages 158 communicate with an annulus 160 in the housing 14. The annulus 160, in turn, communicates with the return port 42 in the housing 14.

Each land corner on the valve sleeve 60 (FIG. 2) and the adjacent land corner on the valve core 62 define a variable flow orifice for fluid flow between respective adjacent grooves in the valve sleeve 60 and the valve core 62. Relative rotation of the valve sleeve 60 and the valve core 62 varies the size of each flow orifice. The lands 136 and 138 each have a chamfered corner 164 (FIG. 4) adjacent to an associated groove 148. Each corner 164 has two facets 166 and 168. Each facet 166 is located adjacent to a respective groove 148 and each facet 168 is located intermediate a respective facet 166 and an outer circumference diameter of the valve core 62.

Figure 4:
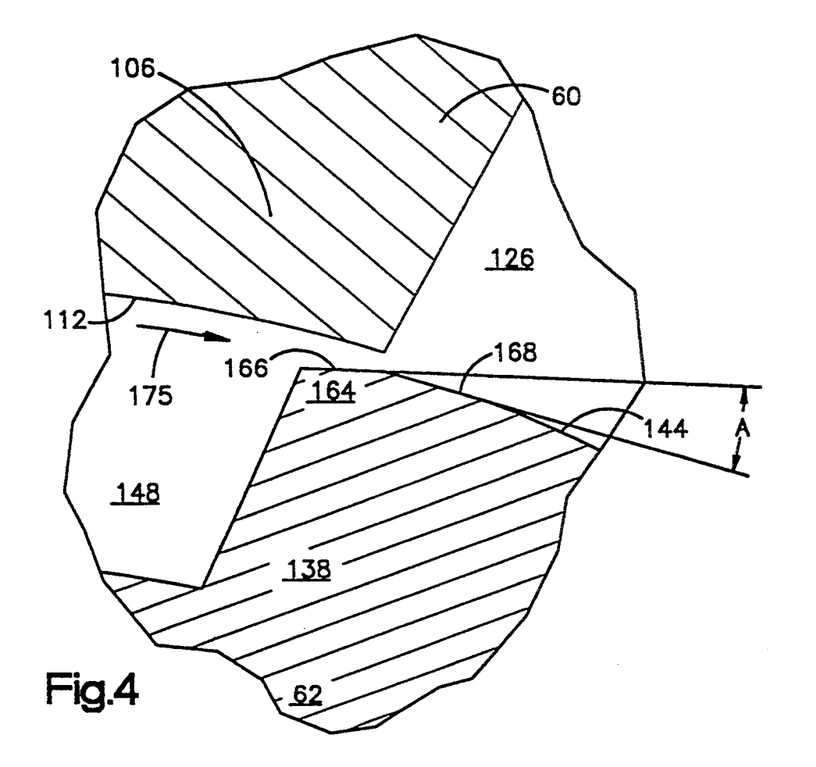
FIG. 4 is an enlargement of a portion of the valve shown in FIG. 3.

In a preferred embodiment, the outer diameter of the valve core 62 is 1.1241 inch and the radial depth of the modification from the outer diameter to each facet 166 surface adjacent to the respective groove 148 is 0.0106 inch. Each two associated facets 166 and 168 are inclined relative to each other at an angle A. In the preferred embodiment, the angle A is 16°.

Figure 5:
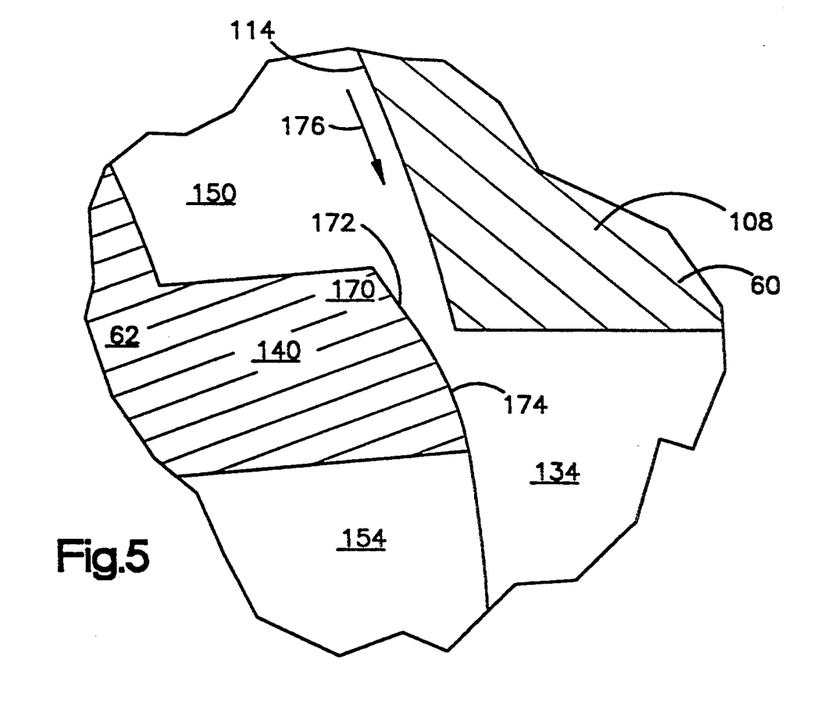
FIG. 5 is an enlargement of another portion of the valve shown in FIG. 3.

The lands 140 (FIG. 2) each have two chamfered corners 170 (FIG. 5). Each chamfered corner 170 has a facet 172 and a tapering curved segment 174. Each facet 172 is located adjacent to a respective groove, either 150 or 152, and each segment 174 is located intermediate a respective facet 172 and an outer circumference diameter of the valve core 62. Each segment 174 has a radius of curvature which changes as the segment 174 extends from the facet 172 toward the outer diameter. In a preferred embodiment, the depth of the modification from the outer diameter to each facet 172 adjacent the respective groove, either 150 or 152, is 0.106 inch.

In operation, the amount of fluid flow from the grooves 148 (FIG. 2) to either the grooves 122 or 126 is dependent upon the proximity of either the lands 136 or 138 to the respective land 106, due to relative rotation of the valve sleeve 60 and the valve core 62. Further, the amount of fluid flow from either the grooves 122 or 126 toward the grooves 134 is dependent upon the proximity of the lands 136, 138 and 140 to the lands 108 and 110, respectively, due to relative rotation of the valve sleeve 60 to the valve core 62.

When the valve sleeve 60 and valve core are in the neutral position (FIG. 2), each land 136 is radially centered relative to a respective groove 122, each land 138 is radially centered relative to a respective groove 126, and each land 140 is radially centered relative to a respective groove 134. Fluid from the pump 44 flows into the grooves 148. The fluid flows substantially equally into the grooves 122 and 126. The fluid flows into the respective grooves 152 and 150 and then into the grooves 134. The pressure of the fluid drops (changes) as it flows through each flow orifice. Thus, a pressure differential occurs across each flow orifice.

The fluid is circulated from the pump 44 through the control valve 10 without being directed toward the steering gear 12. Thus, in the neutral position, the pressures in the chambers 22 and 24 are substantially equal. Therefore, the piston 20 is not moved.

Figure 3:
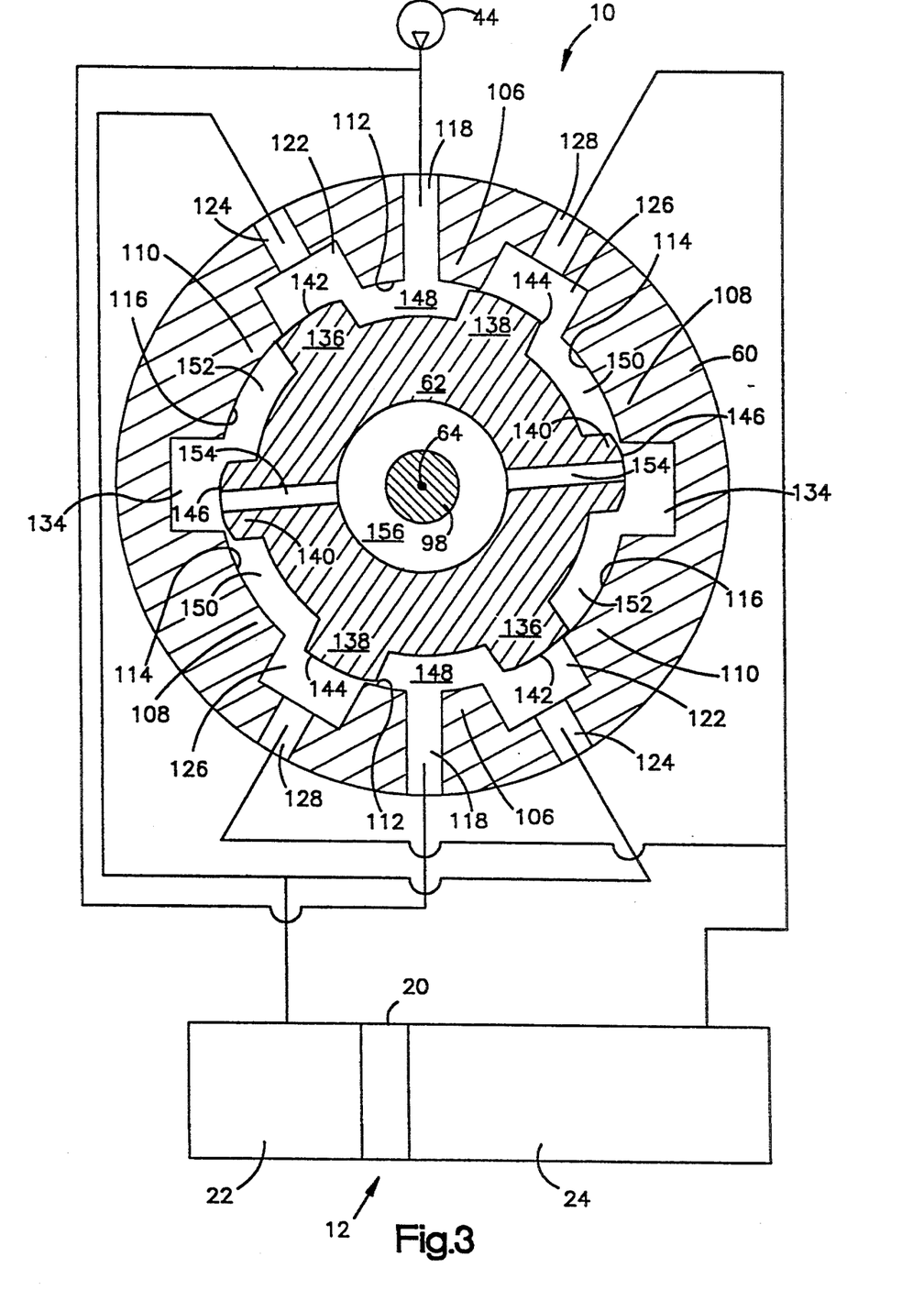
FIG. 3 is a view similar to FIG. 2, with valve members relatively rotated.

Upon rotation of the steering wheel in a first direction (FIG. 3), the valve sleeve 60 and the valve sleeve 62 are relatively rotated in a first direction away from the neutral position. The valve core 62 is rotated counterclockwise (as shown in FIG. 3) relative to the valve sleeve 60. The flow orifices between the grooves 148 and the grooves 122 are increased in size and the flow orifices between the grooves 148 and the grooves 126 are decreased in size.

The pressure drop (differential) across the flow orifices between the grooves 148 and the grooves 122 is decreased and the pressure drop (differential) across the flow orifices between the grooves 148 and the grooves 126 is increased. The flow orifices between the grooves 148 and 126 for flow fluid 175 (FIG. 4) from the grooves 148 to the grooves 126 are convergent. The flow orifices between the grooves 122 (FIG. 3) and the grooves 152 are decreased in size, to substantially zero, and the flow orifices between the grooves 126 and the grooves 150 are increased in size.

The flow orifices between the grooves 150 and the grooves 134 are decreased in size. The pressure drop (differential) across the flow orifices between the grooves 150 and the grooves 134 is increased. The flow orifices between the grooves 150 and the grooves 134 for fluid 176 (FIG. 5) from the grooves 150 to the grooves 134 are convergent. Thus, pressurized fluid is directed toward the chamber 22 (FIG. 3) and the fluid is exhausted from the chamber 24. However, an increased pressure drop across the flow orifices between the grooves 148 and 126 can produce fluid flow noise.

The problem of fluid flow noise is alleviated by the simultaneous decrease in size of the flow orifices between the grooves 150 and the grooves 134 which creates a back pressure in the fluid in the grooves 150 and grooves 126. The back pressures mitigates the pressure drop across the flow orifices between the grooves 148 and grooves 126. Specifically, a chamber region defined by the grooves 148 and 122 has fluid with a relatively high pressure. A chamber region defined by the grooves 126 and 150 has fluid with a relatively intermediate pressure. A chamber region defined by the grooves 134 and 152 has fluid with a relatively low pressure.

The facets 166 and 168 (FIG. 4) provide two different rates of change of the size of the orifices between the grooves 148 and the grooves 126 per unit of relative rotation between the valve sleeve 60 and the valve core 62. The rate of change of the orifice size per unit of relative rotation is greater when the facets 166 are radially aligned with respective edges on the lands 106 than when the facets 168 are radially aligned with the respective edges on the lands 106.

The facets 172 (FIG. 5) provide a first rate of change of the size of the orifices between the grooves 150 and grooves 134 per unit of relative rotation between the valve sleeve 60 and the valve core 62 when aligned with respective edges on the lands 108. Similarly, the tapering curved segments 174 provides a diminishing rate of change of the size of the orifices between the grooves 150 and the grooves 136. Thus, as the valve sleeve 60 (FIG. 3) and the valve core 62 are relatively rotated from the neutral position, the size of the orifices between the grooves 150 and the groove 136 is first decreased and then retained at a constant. This provides the desired back pressure in the grooves 126 and 150 and yet does not prevent sufficient fluid flow during large angle relative rotation between the valve sleeve 60 and the valve core 62.

Upon relative rotation of the valve sleeve 60 and the valve core 62 in a second direction from the neutral position of FIG. 2, fluid from the pump 44 is directed to the chamber 24 and fluid is exhausted from the chamber 22. The flow orifices are changed in size obversely to that which occurred during relative rotation of the valve sleeve 60 and the valve core 62 in the first direction. Thus, valve noise is also suppressed.

In another embodiment of the invention (FIG. 6, wherein structure similar to that of the first embodiment is identified by the same reference numeral) the valve core 62 has two bores 178 and two bores 180. Each bore 178 extends from a respective groove 150 to the passage 156. Each bore 180 extends from a respective groove 152 to the passage 156.

Figure 6:
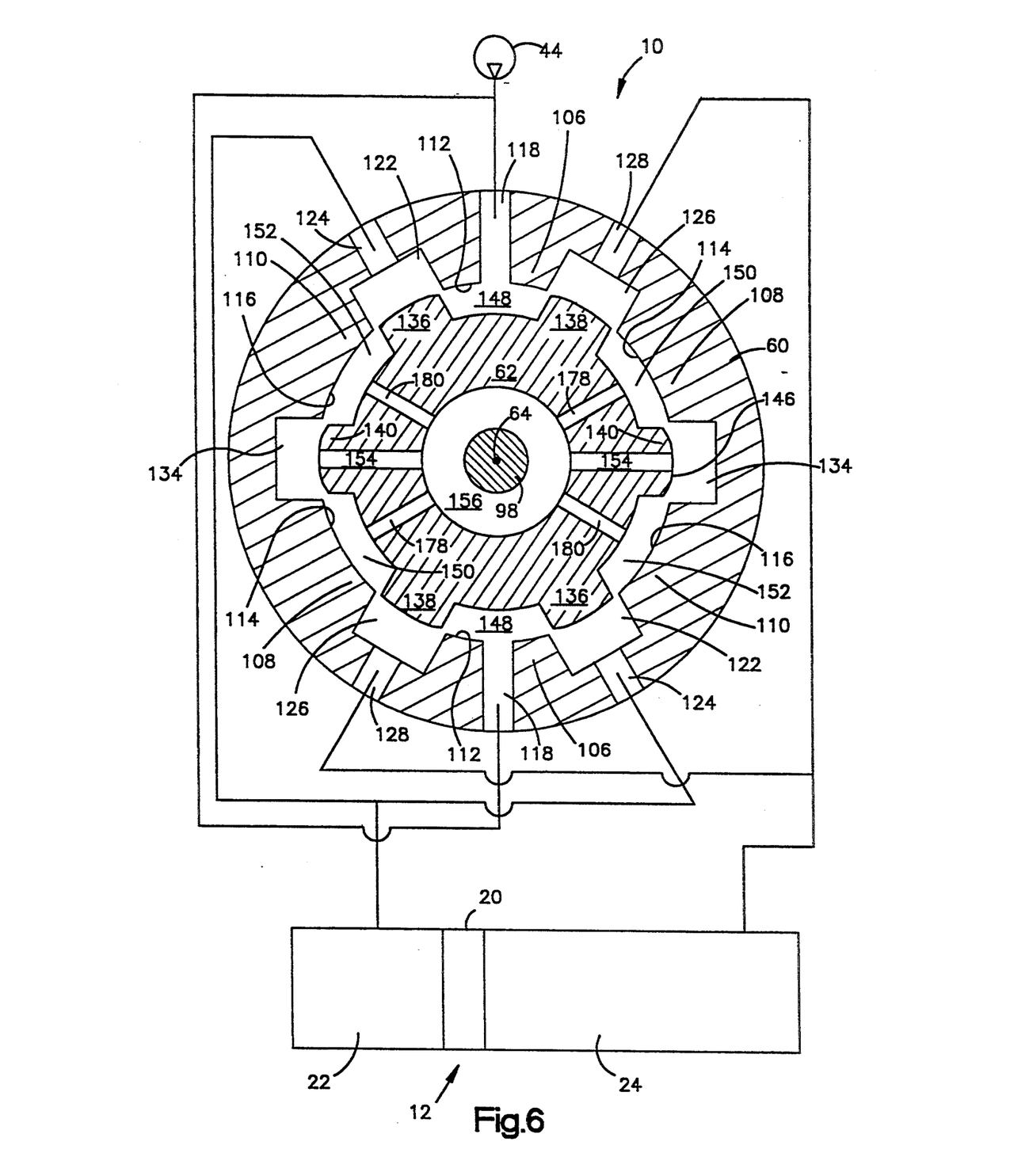
FIG. 6 is a view similar to FIG. 2, showing a second embodiment of the invention.

The bores 178 are sized to permit the desired back pressure to be created in the grooves 126 and 150 to suppress flow noise at the orifices between the grooves 148 and the grooves 126 during counterclockwise rotation of the valve core 62 relative to the valve sleeve 60 from the neutral position. Yet, the bores 178 permit a minimum fluid flow from the groove 150 to the passage 156 for all relative rotational positions of the valve sleeve 60 and the valve core 62, even large angle relative rotation. The bores 180 function similarly for back pressure creation in the grooves 122 and 152 during clockwise rotation of the valve core 62 relative to the valve sleeve 60 from the neutral position.

In a third embodiment of the invention (FIG. 7 wherein structure similar to that of the first embodiment is identified by the same reference numerals), the valve sleeve 60 has four pairs of diametrically opposed lands, 186, 188, 190, and 192, respectively. The valve sleeve 60 has two radially directed passages 118 extending from its outer circumference to its inner circumference. The passages 118 are diametrically opposed about the valve lands 186 and extend through a respective land 186.

Figure 7:
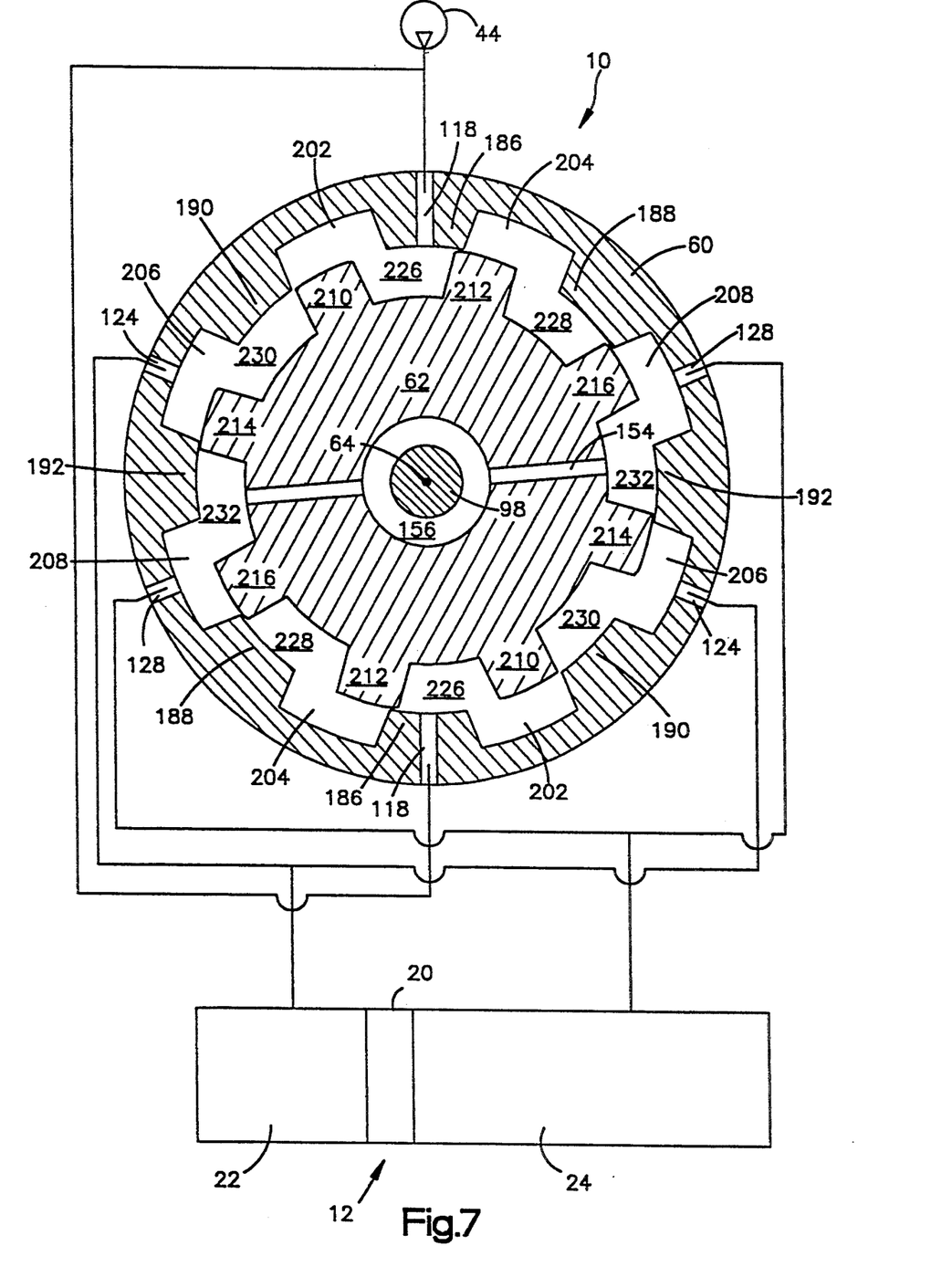
FIG. 7 is a view similar to FIG. 3, showing a third embodiment of the invention, with valve members relatively rotated.

The valve sleeve 60 has on its inner surface two axially extending grooves 202, which are diametrically opposed about the inner circumference of the valve sleeve 60. Each groove 202 is located between a respective land 186 and a respective land 190. The valve sleeve 60 has on its inner surface two axially extending grooves 204, which are diametrically opposed about the inner circumference of the valve sleeve 60. Each groove 204 is located between a respective land 186 and a respective land 188.

The valve sleeve 60 has on its inner surface two axially extending grooves 206, which are diametrically opposed about the inner circumference of the valve sleeve 60. Each groove 206 is located between a respective land 190 and a respective land 192. Each of the grooves 206 communicates with a respective passage 124.

The valve sleeve 60 has on its inner surface two axially extending grooves 208, which are diametrically opposed about the inner circumference of the valve sleeve 60. Each groove 208 is located between a respective land 188 and a respective land 192. Each of the grooves 208 communicates with a respective radially extending passage 128.

The valve core 62 has four pairs of diametrically located lands 210, 212, 214 and 216, respectively. The valve core 62 has two axially extending grooves 226, which are diametrically opposed about the outer circumference of the valve core 62 and communicate with the passages 118 in the valve sleeve 60. Each groove 226 is located between respective land 210 and a respective land 212. The extent of the grooves 226 around the outer circumference of the valve core 62 is such that each of the grooves 226 communicates equally with respective grooves 202 and 204 when the valve core 62 is in a centered or neutral position relative to the valve sleeve 60 (as shown in FIG. 2).

The valve core 62 has two axially extending grooves 228, which are diametrically opposed about the outer circumference of the valve core 62. Each groove 228 is located clockwise (as shown in FIG. 4) about the valve core 62 from an adjacent groove 226 and between a respective land 212 and a respective land 216. The valve core 62 has two axially extending grooves 230 in its circumference. The grooves 230 are diametrically opposed. Each groove 230 is located counterclockwise (as shown in FIG. 4) about the valve core 62 from an adjacent groove 226 and between a respective land 210 and a respective land 214.

The valve core 62 has two axially extending grooves 232, which are diametrically opposed about the outer circumference of the valve core 62. The extent of the grooves 232 around the outer circumference of the valve core 62 is such that each of the grooves 232 communicates with respective grooves 206 and 208 when the valve core 62 is in the neutral position relative to the valve sleeve 60. The valve core 62 has two radially extending internal passages 154. Each passage 154 communicates with a respective groove 232 on the valve core 62.

The lands 210 and 212 each have a chamfered corner adjacent to an associated groove 226. The lands 214 each have a chamfered corner adjacent to an associated groove 230. The lands 216 each have a chamfered corner adjacent to an associated groove 228.

In operation, the amount of fluid flow from the grooves 226 toward either the grooves 206 or 208 is dependent upon the amount of relative rotation of the valve sleeve 60 and the valve core 62. Further, the amount of fluid flow from either the grooves 206 or 208 toward the grooves 232 is dependent upon relative rotation of the valve sleeve 60 to the valve core 62.

When the valve sleeve 60 and valve core 62 are in the neutral position fluid from the pump 44 flows into the grooves 226. The fluid flows substantially equally into the grooves 202 and 204 and then into grooves 230 and 228, respectively. The fluid flows into the respective grooves 206 and 208 and then into the grooves 232. The pressure of the fluid drops (changes) as it flows through each flow orifice. Thus, a pressure differential occurs across each flow orifice.

The fluid is circulated from the pump 44 through the control valve 10 without being directed toward the steering gear 12. Thus, in the neutral position, the pressures in the chambers 22 and 24 are substantially equal. Therefore, the piston 20 is not moved.

Upon rotation of the steering wheel in a first direction, the valve sleeve 60 and the valve sleeve 62 are relatively rotated in a first direction away from the neutral position. The valve core 62 is rotated counterclockwise (as shown in FIG. 4) relative to the valve sleeve 60. The flow orifices between the grooves 226 and the grooves 202 are increased in size and the flow orifices between the grooves 226 and the grooves 204 are decreased in size. The pressure drop (differential) across the flow orifices between the grooves 226 and the grooves 202 is decreased and the pressure drop (differential) across the flow orifices between the grooves 226 and the grooves 204 is increased.

The flow orifices between the grooves 202 and the grooves 230 are decreased in size, slightly. The flow orifices between the grooves 204 and the grooves 228 are increased in size. The flow orifices between the grooves 230 and the grooves 206 are increased in size. The flow orifices between the grooves 206 and the grooves 232 are essentially blocked. The flow orifices between the grooves 228 and the grooves 208 are decreased in size. The flow orifices between the grooves 208 and 232 are increased in size. Thus, pressurized fluid is directed toward the chamber 22 and the fluid is exhausted from the chamber 24. However, an increased pressure drop across the flow orifices between the grooves 226 and 204 can produce fluid flow noise.

The problem of fluid flow noise is alleviated by the simultaneous decrease in size of the flow orifices between the grooves 228 and the grooves 208 which creates a back pressure in the fluid in the grooves 228 and grooves 204. The back pressures mitigates the pressure drop across the flow orifices between the grooves 226 and grooves 204. Specifically, a chamber region defined by the grooves 226, 202, 230 and 206 has fluid which is relatively high pressure. A chamber region defined by the grooves 204 and 228 has fluid which is relatively intermediate in pressure. A chamber region defined by the grooves 208 and 232 has fluid which is relatively low in pressure.

Upon relative rotation of the valve sleeve 60 and the valve core 62 in a second direction from the neutral position, fluid from the pump 44 is directed to the chamber 24 and fluid is exhausted from the chamber 22. The flow orifices are changed in size obversely to that which occurred during relative rotation of the valve sleeve 60 and the valve core 62 in the first direction. Thus, valve noise is also suppressed.

From the above description of the invention, those skilled in the art will perceive improvements, changes and modifications. Such improvements, changes and modifications within the skill of the art are intended to be covered by the appended claims.

Having described the invention, the following is claimed:

1. A valve for controlling hydraulic fluid, said valve comprising:
   first and second relatively movable valve members;
   said valve members having cooperating surfaces for defining first and second orifice means for metering fluid from a pressurized fluid source toward first and second locations, respectively, in a fluid utilization device;
   said valve members having a displaced position in which said first orifice means is increased in size which reduces the magnitude of a pressure differential across said first orifice means and said second orifice means is decreased in size which increases the magnitude of a pressure differential across said second orifice means; and
   said valve members including means for increasing the pressure on a downstream side of said second orifice means to reduce the magnitude of the pressure differential across said second orifice means for controlling valve noise, including cooperating surfaces on said first and second valve members for defining a third orifice means for metering fluid flow;
   said valve members having surfaces which define a first chamber 148 in fluid communication with the fluid source, a second chamber 150 in fluid communication with said first chamber 148 through the second orifice means, and a third chamber 134 in fluid communication with a fluid reservoir and in fluid communication with said second chamber 150 through said third orifice means; when said valve members are in the displaced position fluid in said first chamber 148 having a relatively high fluid pressure, fluid in said second chamber 150 having a relatively intermediate fluid pressure and fluid in said third chamber 134 having a relatively low fluid pressure;
   said cooperating surfaces defining said second orifice means including a planar facet surface and said surface defining said third orifice means including a planar facet surface.

2. A valve as set forth in claim 1, wherein said first chamber is in fluid communication with the first location in the utilization device and said second chamber is in fluid communication with the second location in the utilization device when said valve members are in the displaced position.

3. A valve as set forth in claim 1, wherein said first and second members are a valve sleeve and a valve core, respectively, said valve core and valve sleeve being relatively rotatable about a common axis.

4. A valve as set forth in claim 3, wherein said valve sleeve has first-fourth groove means, said valve core has a fifth-eighth groove means, said first groove means is in fluid communication with the first location in the fluid utilization device, said second groove means is located adjacent to said first groove means, said third groove means is adjacent to said fourth groove means, said fourth groove means is in fluid communication with the second location in the fluid utilization device, said fifth groove means is in fluid communication with said fluid source, said sixth groove means is in fluid communication with a fluid reservoir, said seventh and eighth groove means are interposed between said fifth and sixth groove means;
   when said valve members are in the displaced position fluid is directed from said fifth groove means to said second groove means to said seventh groove means and then to said first groove means, fluid flow is restricted between said fifth groove means and said third groove means and is restricted between said eighth groove means to said fourth groove means.

5. A valve for controlling flow of hydraulic fluid, said valve comprising:
   first and second relatively movable valve members;
   one of said valve members having a first port means for fluid communication with a pressurized fluid source, one of said valve members having a second port means for fluid communication with a reservoir, one of said valve members having a third port means for fluid communication with a first location in a fluid utilization device and one of said valve members having a fourth port means for fluid communication with a second location in the utilization device;
   said first and second valve members having cooperating surface means for defining a variable first flow orifice means for controlling fluid flow from the first port means to the third port means, a variable second flow orifice means for controlling fluid flow from the first port means to the fourth port means, a variable third orifice means for controlling fluid flow from the fourth port means to the second port means;
   during relative movement of said first and second valve means from a neutral position, said first orifice means increases in size to decrease pressure change across said first orifice means and to increase fluid flow from the first port means to third port means, said second orifice means decreases in size to increase pressure change across said second orifice means and to decrease fluid flow from the first port means to the fourth port means, and said third orifice means decreases in size to increase pressure change across said third orifice means and to increase pressure in said fourth port means for moderating the pressure change across said second orifice means to control valve noise;

said first and second valve members being a valve sleeve and a valve core, respectively, said valve core and said valve sleeve being relatively rotatable about a common axis and each having a plurality of lands, said cooperating surface means being located on said lands, said valve core having an outer circumference diameter, said surface means defining a variable third flow orifice means including a surface on one of said lands of said valve core with a planar facet and a tapering curved segment which tapers from said planar segment to said outer circumferential diameter of said valve core.

6. A valve as set forth in claim 5, wherein said surface means defining a variable second flow orifice means includes a land edge on said valve sleeve and an end face on a land on said valve core having first and second planar facets, said second flow orifice means varying in size at a first rate during relative rotation of said valve sleeve and valve core when said first facet is radially aligned with said land edge on said valve sleeve and said second flow orifice means varying in size at a second rate during relative rotation of said valve sleeve and valve core when said second facet is radially aligned with said land edge on said valve sleeve.

7. A valve as set forth in claim 5, wherein said valve core has a bore means for interconnecting said second reservoir port means and said fourth motor port means.

8. A valve for controlling flow of hydraulic fluid, said valve comprising:

first and second relatively movable valve members;
one of said valve members having a first port means for fluid communication with a pressurized fluid source, one of said valve members having a second port means for fluid communication with a reservoir, one of said valve members having a third port means for fluid communication with a first location in a fluid utilization device and one of said valve members having a fourth port means for fluid communication with a second location in the utilization device;

said first and second valve members having cooperating surface means for defining a variable first flow orifice means for controlling fluid flow from the first port means to the third port means, a variable second flow orifice means for controlling fluid flow from the first port means to the fourth port means, a variable third orifice means for controlling fluid flow from the fourth port means to the second port means;

during relative movement of said first and second valve means from a neutral position, said first orifice means increases in size to decrease pressure change across said first orifice means and to increase fluid flow from the first port means to third port means, said second orifice means decreases in size to increase pressure change across said second orifice means and to decrease fluid flow from the first port means to the fourth port means, and said third orifice means decreases in size to increase pressure change across said third orifice means and to increase pressure in said fourth port means for moderating the pressure change across said second orifice means to control valve noise;

said third flow orifice interconnecting a groove on said valve core and a groove on said valve sleeve, said second port means including a bore extending through a land on said valve core facing said groove on valve sleeve.

9. A valve as set forth in claim 8, wherein said first and second valve members are a valve sleeve and a valve core, respectively, second flow orifice means has a cross-sectional flow area which is convergent in a flow direction toward said fourth port means, said third flow orifice has a cross-sectional flow area which is convergent in a flow direction toward said second port means.

10. A valve as set forth in claim 8, wherein said first and second valve members are a valve sleeve and a valve core, respectively, said valve sleeve has a first groove in fluid communication with said fourth port, a second groove in fluid communication with said second port and a first land between said first and second grooves, said valve core has a second land facing said first groove, a third land facing said second groove and a third groove opposite said first land, said third orifice being defined by cooperating surfaces on said first and third lands, fluid flowing from said fourth port means to said second port means moves from said first groove to said third groove and from said third groove to said second groove.

11. A valve for controlling hydraulic fluid, said valve comprising:

first and second port means for fluid connection with first and second locations, respectively, in a fluid utilization device;

supply and return port means for fluid connection with a pressurized fluid source and a fluid reservoir, respectively; and first and second relatively movable valve members;
said valve members including cooperating surfaces for defining first and second orifice means for metering fluid from said supply port means toward said first and second port means, respectively, and for defining third and fourth orifice means for metering fluid from said first and second port means toward said return port means, respectively;

said valve members having a displaced position in which said first orifice means is increased in size which reduces the magnitude of a pressure differential across said first orifice means to communicate pressurized fluid flow from said supply port means to said first port means, said second orifice means is decreased in size which increases the magnitude of a pressure differential across said second orifice means, said third orifice means is decreased in size to restrict fluid flow from said first port means to said return port means, and said fourth orifice means is increased in size to communicate fluid flow from said second port means to said return port means; and said valve members including means for increasing the pressure on a downstream side of said second orifice means to reduce the magnitude of the pressure differential across said second orifice means for controlling valve noise;

said cooperating surface means defining said second orifice means includes a first pair of opposed land faces located between said supply port means and said second port means, said means for increasing the pressure on a downstream side of said second orifice includes a second pair of opposed land faces located between said supply port means and said second port means.

12. A valve as set forth in claim 11, wherein said means for increasing the pressure on a downstream side of said second orifice means includes cooperating surfaces which define a chamber for retaining a fluid pressure which is less than the fluid pressure in the supply port means and which is greater than the fluid pressure in the second port means when said valve members are in the displaced position.

13. A valve for controlling hydraulic fluid, said valve comprising:

first and second port means for fluid connection with first and second locations, respectively, in a fluid utilization device;

supply and return port means for fluid connection with a pressurized fluid source and a fluid reservoir, respectively; and first and second relatively movable valve members;

said valve members including cooperating surfaces for defining first and second orifice means for metering fluid from said supply port means toward said first and second port means, respectively, and for defining third and fourth orifice means for metering fluid from said first and second port means toward said return port means, respectively;

said valve members having a displaced position in which said first orifice means is increased in size which reduces the magnitude of a pressure differential across said first orifice means to communicate pressurized fluid flow from said supply port means to said first port means, said second orifice means is decreased in size which increases the magnitude of a pressure differential across said second orifice means, said third orifice means is decreased in size to restrict fluid flow from said first port means to said return port means, and said fourth orifice means is increased in size to communicate fluid flow from said second port means to said return port means; and said valve members including means for increasing the pressure on a downstream side of said second orifice means to reduce the magnitude of the pressure differential across said second orifice means for controlling valve noise;

one of said first and second valve members having first, second and third grooves, and the other of said first and second valve members having a fourth groove, said first groove being in direct fluid communication with said supply port means, said third groove being in direct fluid communication with said return port means, said fourth groove being in direct fluid communication with said second port means and said second groove being interposed between said first and third grooves and having no direct fluid communication with said supply port means, said return port means and said second port means when said valve members are in the displaced position.

14. A valve for controlling hydraulic fluid, said valve comprising:

first and second port means for fluid connection with first and second locations, respectively, in a fluid utilization device;

supply and return port means for fluid connection with a pressurized fluid source and a fluid reservoir, respectively; and first and second relatively movable valve members;

said valve members including cooperating surfaces for defining first and second orifice means for metering fluid from said supply port means toward said first and second port means, respectively, and for defining third and fourth orifice means for metering fluid from said first and second port means toward said return port means, respectively;

said valve members having a displaced position in which said first orifice means is increased in size which reduces the magnitude of a pressure differential across said first orifice means to communicate pressurized fluid flow from said supply port means to said first port means, said second orifice means is decreased in size which increases the magnitude of a pressure differential across said second orifice means, said third orifice means is decreased in size to restrict fluid flow from said first port means to said return port means, and said fourth orifice means is increased in size to communicate fluid flow from said second port means to said return port means; and said valve members including means for increasing the pressure on a downstream side of said second orifice means to reduce the magnitude of the pressure differential across said second orifice means for controlling valve noise;

said first and second valve members are a valve sleeve and a valve core, respectively, said valve core and valve sleeve being relatively rotatable about a common axis, said valve sleeve having first-fourth grooves located sequentially along an extent of said valve sleeve and having first-fourth lands located sequentially along said extent of said valve sleeve, said core having fifth-eighth grooves located sequentially along an extent of said valve core and having fifth-eighth lands located sequentially along said extent of said valve core, said first port means being in direct fluid communication with said first groove, said second port means being in direct fluid communication with said fourth groove, said supply port means being in direct fluid communication with said seventh groove, said return port means being in fluid communication with said fifth groove means, said surfaces defining said first orifice means including surfaces on said third land and said sixth land, said surface defining said second orifice means includes surfaces on said third land and said seventh land, said means for increasing the pressure on a downstream side of said second orifice means includes cooperating surfaces on said fourth land and said eighth land which define a fifth orifice means for restricting flow of fluid from a chamber defined by said third groove and said eighth groove when said valve members are in the displaced position to retain a fluid pressure in said chamber which is less than the fluid pressure in said seventh groove and greater than the fluid pressure in said fourth groove.

15. A valve for controlling hydraulic fluid, said valve comprising:

a valve sleeve; and a valve core rotatable relative to said valve sleeve about a common axis;

said valve sleeve and said valve core including cooperating surfaces defining first and second orifice means for metering fluid from a pressurized fluid source toward first and second locations, respectively, in a fluid utilization device;

said valve sleeve and said valve core being rotatable from a neutral position toward a displaced position for increasing a cross-sectional size of said first orifice means to reduce the magnitude of a pressure differential across said first orifice means and for decreasing a cross-sectional size of said second orifice means to increase the magnitude of a pressure differential across said second orifice means; and said valve sleeve and said valve core including cooperating surfaces defining a third orifice means for increasing the pressure on a downstream side of said second orifice means to reduce the magnitude of the pressure differential across said second orifice means for controlling valve noise, said cooperating surfaces defining said third orifice means being located on lands which radially overlap for a range of positions between the neutral and displaced positions, said third orifice means varying in cross-sectional size during relative rotation of said valve sleeve and valve core within said range of positions.

16. A valve as set forth in claim 15, wherein said valve sleeve has a total of six grooves spaced about an inner periphery of said valve sleeve, a first diametrically opposed pair of grooves being in direct fluid communication with a port for the first location in the fluid utilization device, a second diametrically opposed pair of grooves being in direct fluid communication with a port for the second location in the fluid utilization device, and a third diametrically opposed pair of grooves being in direct fluid communication with a port for a fluid reservoir.

17. A valve as set forth in claim 15, wherein said valve sleeve has a total of eight grooves spaced about an inner periphery of said valve sleeve, a first diametrically opposed pair of grooves being in direct fluid communication with a first port for the first location in the fluid utilization device, a second diametrically opposed pair of grooves being in direct fluid communication with a second port for the second location in the fluid utilization device;

a third diametrically pair of grooves and a fourth diametrically opposed pair of grooves, said third and fourth pairs of grooves being adjacent to a pair of diametrically opposed grooves on said valve core which are in direct fluid communication with a third port for the pressurized fluid source.

18. A valve as set forth in claim 17 wherein said third pair of grooves having no direct fluid communication with said first port, said second port, said third port or a port for direct fluid communication with a reservoir.

19. A valve as set forth in claim 15, wherein said valve core has an internal passage for flow of fluid away from said grooves and toward a reservoir.

20. A valve as set forth in claim 15, including surface means for defining a chamber for holding fluid on the downstream side of said second orifice, first port means for fluid connection with the first location in the utilization device, second port means for fluid connection with the second location in the utilization device, supply port means for fluid connection with the source, and return port means for fluid connection with a fluid reservoir, said third orifice means retaining a fluid pressure in said chamber which is less than a fluid pressure in said supply port means and a fluid pressure in said first port means, and which is greater than a fluid pressure in said return port means and a fluid pressure in said second port means.

* * * * *

UNITED STATES PATENT AND TRADEMARK OFFICE
CERTIFICATE OF CORRECTION

PATENT NO. : 5,417,244
DATED : May 23, 1995
INVENTOR(S) : Hermann W. Behrens, Wendell L. Gilbert, George M. Harpole
Jane M. Lin and Michael F. Wolff It is certified that error appears in the above-indentified patent and that said Letters Patent is hereby corrected as shown below:

Column 9, line 56, after "chamber" delete --148--.

Column 9, line 57, after "chamber" delete --150--.

Column 9, line 58, after "chamber" delete --148--.

Column 9, line 59, after "chamber" delete --134--.

Column 9, line 61, after "chamber" delete --150--.

Column 9, line 64, after "chamber" delete --148--.

Column 9, line 65, after "chamber" delete --150--.

Column 9, line 67, after "chamber" delete --134--.

Signed and Sealed this

Seventeenth Day of October, 1995

*Attest:*

BRUCE LEHMAN

*Attesting Officer*  *Commissioner of Patents and Trademarks*